United States Patent [19]

Matsushita

[11]  4,199,056
[45]  Apr. 22, 1980

[54] ROLLER CONVEYOR ASSEMBLY

[75] Inventor: Masahiro Matsushita, Nagoya, Japan

[73] Assignee: Line Kogyo Kabushiki Kaisha, Nagoya, Japan

[21] Appl. No.: 920,950

[22] Filed: Jun. 30, 1978

[30] Foreign Application Priority Data

Jul. 26, 1977 [JP] Japan .................................. 52-90076

[51] Int. Cl.$^2$ .............................................. B65G 13/07
[52] U.S. Cl. .................................................. 198/781
[58] Field of Search ................................ 198/781, 460

[56] References Cited

U.S. PATENT DOCUMENTS

| | | | |
|---|---|---|---|
| 1,900,150 | 3/1933 | Anderson | 198/781 |
| 3,012,652 | 12/1961 | Poel et al. | 198/781 |
| 3,537,568 | 11/1970 | Leach | 198/781 |
| 3,612,247 | 10/1971 | Pipp | 198/781 |
| 3,760,932 | 9/1973 | Schneider | 198/781 |

*Primary Examiner*—James L. Rowland
*Attorney, Agent, or Firm*—Griffin, Branigan and Butler

[57] ABSTRACT

A roller conveyor assembly is adapted to prevent backed up pressure on a conveyor line when a load container is compelled to stop. The roller conveyor assembly comprises a plurality of conveyor rollers (2) mounted in a frame (1) so as to form a travelling surface. The travelling surface is divided into a plurality of successive zones each containing a load sensing means (9), a group of conveyor rollers (2a), and a control means. When a stalled container (N-1) is sensed in a reference zone, the control means is operative to disengage the transmission of power to a preceding, adjacent, upstream zone upon the detection of a load container (N-2) in the upstream zone. In this manner, a collision between load containers is prevented.

5 Claims, 6 Drawing Figures

ROLLER CONVEYOR ASSEMBLY

BACKGROUND OF THE INVENTION

1. Field of the Invention

This invention generally relates to a conveyor assembly and improvements therein and more particularly to a conveyor assembly arranged for the transportation and storage of articles without jamming of such articles during transport.

2. Prior Art

FIG. 6 illustrates a conventional roller assembly arranged to deal with the problems associated with a stalled load container on a travelling surface. Typically, a driven, endless belt 13 engages rollers 15 which are restricted by a connection frame 16 on both sides. Axial-supported conveyor rollers 12 engage each of the driven rollers 15 and form a travelling surface adapted to carry load containers such as C-1 and C-2. A container sensing means 19 is provided and comprises a lever 18 pivotally mounted to the connection frame 16 and one end of the lever 18 is attached to an upstream connection frame 16. A spring secures the container sensing means 19 so that it extends over the travelling surface.

During operation, the load containers are carried along the travelling surface with sufficient force to press down the container sensing means 19. When a container C-1 depresses container sensing means 19, the lever 18 is pivoted so that the upstream connection frame 16 is displaced laterally and the driven rollers 15 disengage the conveyor rollers 12. Correspondingly, a next, upstream container C-2 is halted thereby preventing a collision.

However, the foregoing prior roller assembly cannot prevent collisions involving additional upstream load containers. As illustrated in FIG. 6, the upstream load container C-2 is stalled short of engaging a container sensing means 19. As a result, additional upstream conveyor rollers are not disconnected from the endless belt 13, and any additional, upstream containers will collide with container C-2 causing the so-called "line pressure" phenomenon.

SUMMARY OF THE INVENTION

It is an object of this invention to provide an arrangement for a roller conveyor adapted to prevent a collision between a stalled load container and a conveyed load container.

Another object of this invention is to provide an improved roller conveyor assembly adapted to eliminate line pressure regardless of the number of stalled load containers.

A further object of the invention is to provide a conveyor roller assembly which will completely stop a load container whenever two consecutive container sensing means are activated.

Yet another object of the invention is to provide a conveyor roller assembly adapted to eliminate line pressure regardless of the load container weight.

It is another object of this invention to provide a roller conveyor structure which is inexpensive and easy to manufacture and maintain.

Still another object of this invention is to provide a roller conveyor structure which insures uniform spacing between load containers.

In accordance with the principles of the present invention, a roller conveyor assembly comprises a travelling surface for load containers constructed from conveyor rollers which are rotatably mounted in a frame and driven by an endless belt. The travelling surface is divided into a plurality of successive zones each containing one load sensing means, a group of conveyor rollers, and a control means. The control means, in each zone, is responsive to the presence of a container in that zone such that if two load containers are sensed in adjacent zones, the control means is operative to disengage the drive belt to the upstream zone thereby preventing a collision as well as providing uniform spacing.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout different views. The drawings are not necessarily to scale, emphasis instead being placed upon illustrating the principles of the invention.

DESCRIPTION OF THE PREFERRED EMBODIMENTS

Figure 1:
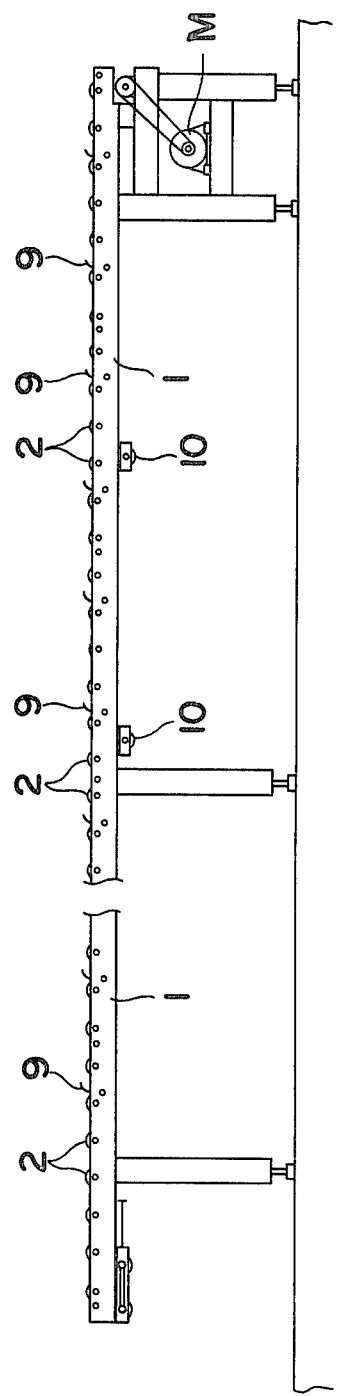
FIG. 1 is a side view of the present invention.

A roller conveyor assembly as illustrated in FIG. 1 comprises a pair of long support frames 1 which extend laterally in a parallel relationship. A plurality of conveyor rollers 2 are rotatably supported by frames 1, and are arranged in a parallel relationship to one another at a fixed distance so as to form a travelling surface for load containers. A motor M drives an endless drive belt 3 (FIG. 4) through any suitable linkage.

Figure 4:
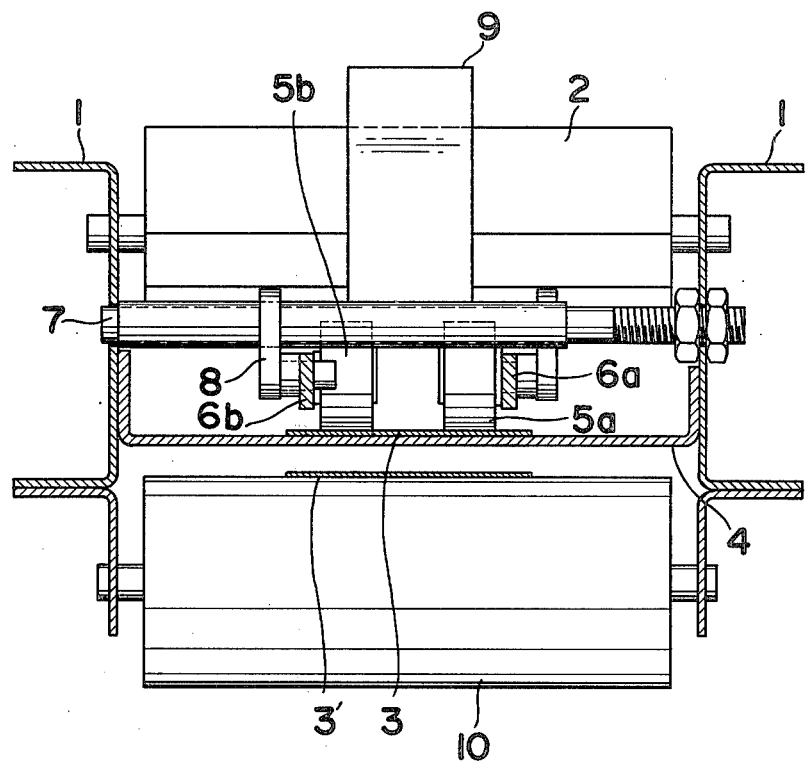
FIG. 4 is a front view, in section, of the present invention.
Figure 6:
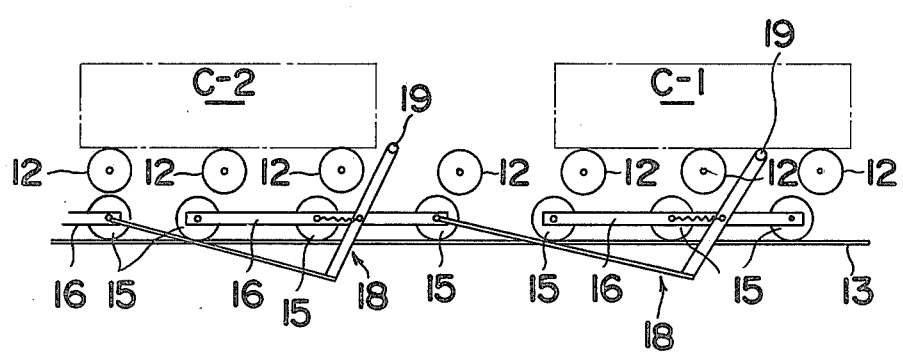
FIG. 6 illustrates a typical prior art roller conveyor assembly.

Referring to FIG. 4, the endless drive belt 3, 3' is supported during its travel by a stationary base plate 4 and a return roller 10. The stationary base plate 4 is disposed between the support frames 1 as in the return roller 10. The conveyor rollers 2 are detachably coupled to the drive belt 3 by a first transmission roller from a group of transmission rollers 5a and a second transmission roller from a group of transmission rollers 5b. The transmission rollers operate independently of one another and are located in a side-by-side arrangement such that they engage the conveyor roller on either side of its longitudinal center line.

Figure 2:
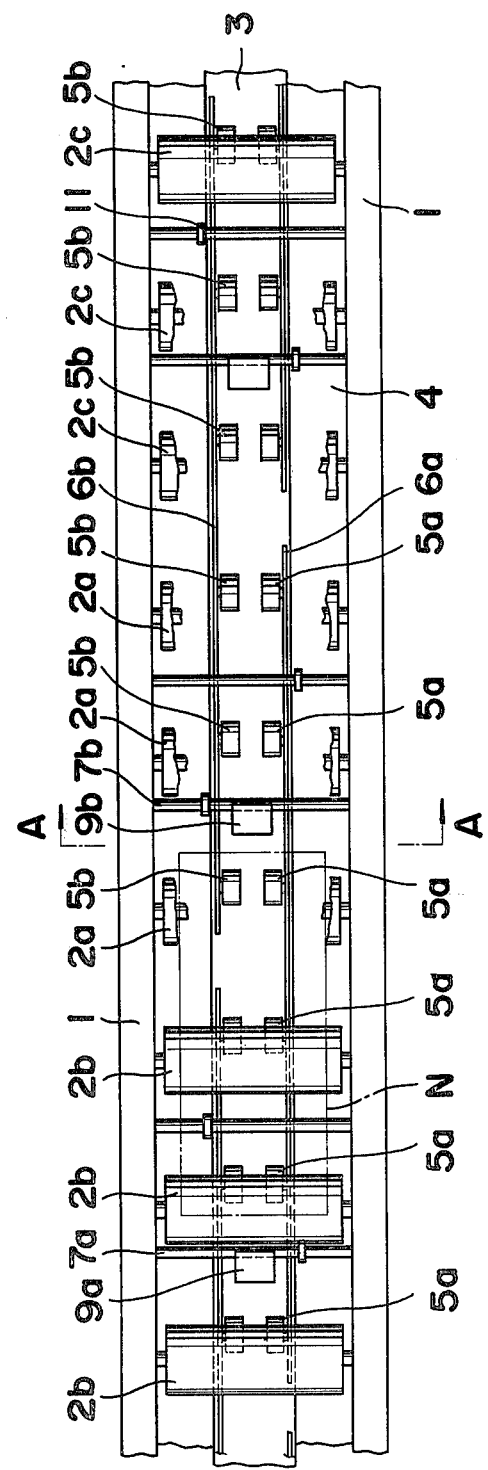
FIG. 2 is a top view, partially in section, of the present invention.
Figure 3:
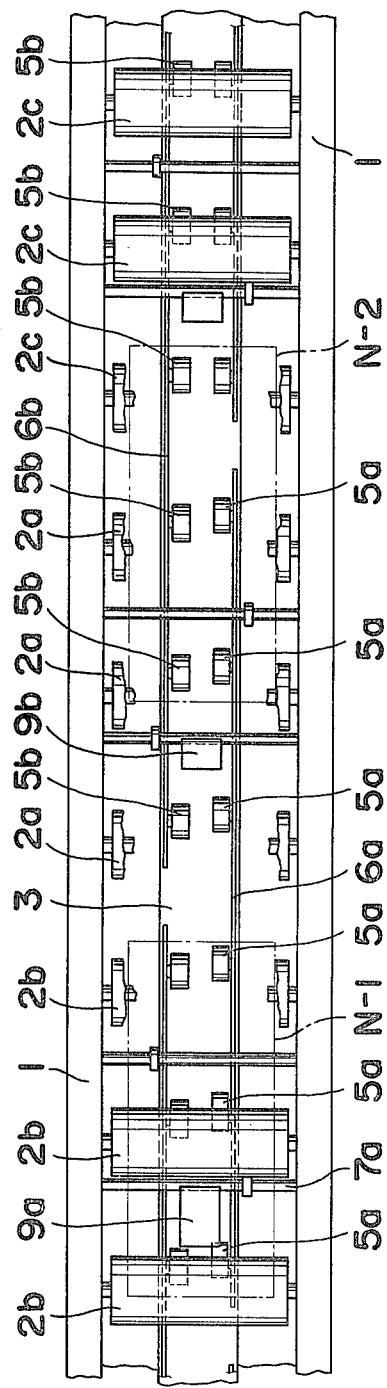
FIG. 3 is a top view, in partial section, of the present invention wherein two load containers are present in adjacent zones.

In accordance with this invention, the conveyor rollers, first transmission rollers and second transmission rollers are divided into groups so as to form a travelling surface which is divided into a plurality of successive, independent zones. As shown in FIGS. 2 and 3, the conveyor rollers 2 may be divided into three zones 2a, 2b, 2c, each consisting of three rollers. In regard to the transmission rollers 5, there is shown two complete groups 5a, 5b, each comprising six transmission rollers. The transmission rollers of groups 5a, 5b, are connected as a group by frame bars 6a, 6b, respectively.

Figure 5:
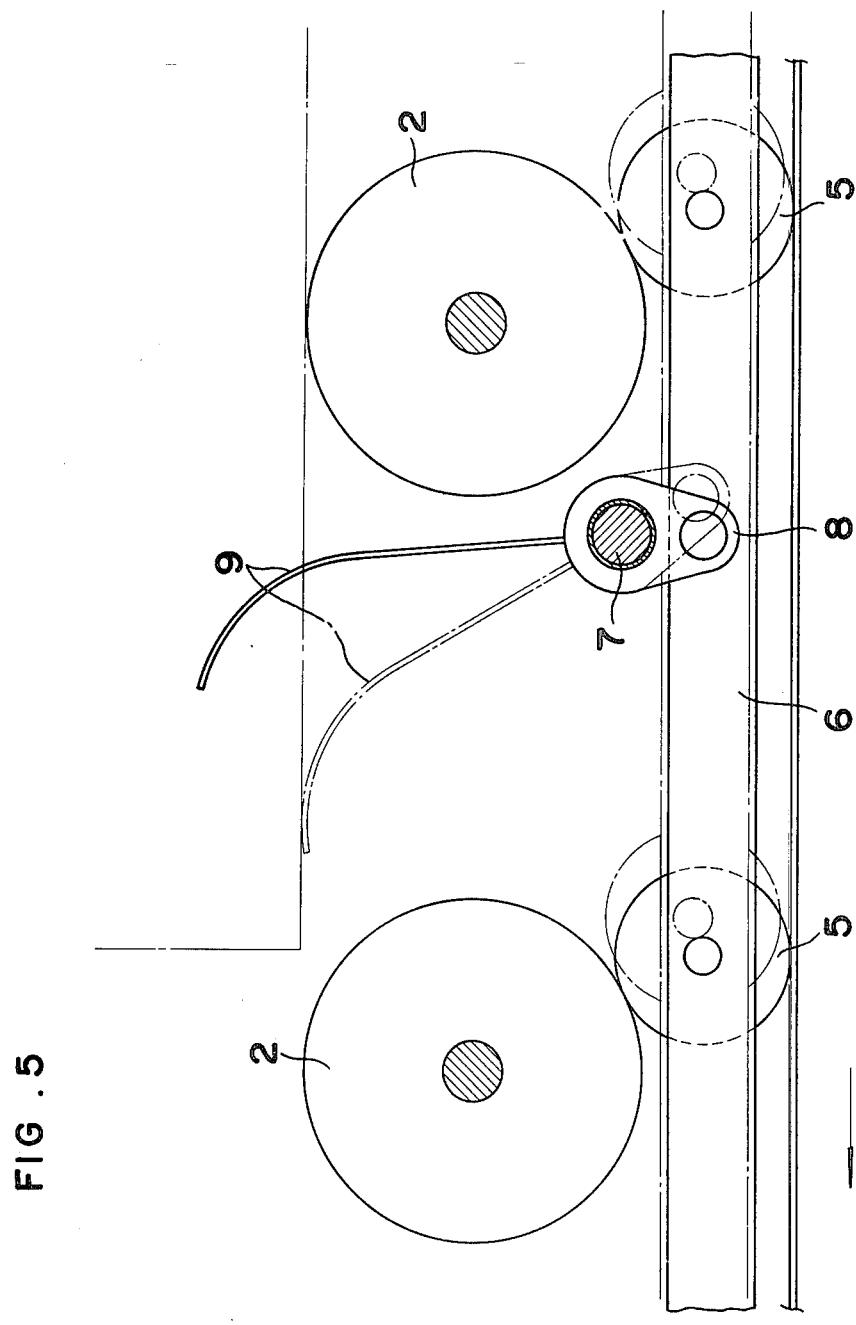
FIG. 5 illustrates the container sensing means and control means.

Each zone is provided with a detection arm 9 having a configuration as illustrated in FIGS. 4 and 5. A shaft pin 7 is rigidly supported by the frame 1. A lever arm 8 is pivoted around the shaft pin 7 at the upper portion and pivotally connected to the frame bar 6 at the lower portion. The shaft pin 7 is provided with a balance weight and spring means (not shown) which bias detection arm 9 and lever arm 8 to the solid line position shown in FIG. 5 so that the transmission rollers 5 may be frictionally coupled to both the conveyor rollers 2 and the drive belt 3.

As seen in FIGS. 4 and 5, a detection arm 9 is provided in the middle portion of shaft pin 7 and has an upper portion formed in an arcuate configuration adapted to extend above the travelling surface. A detection arm 9a (FIG. 3) is located between the first and second conveyor rollers 2 of a respective group. In this manner, the detection arm 9a is depressed by the weight of a load container N-1 which swings shaft pin 7a and displaces frame bar 6a. As a result, by the operation of frame bar 6a, the transmission rollers 5a associated with the frame bar 6a can be pivoted out of frictional engagement with the conveyor rollers comprising groups 2a and 2b. A detection arm 9b operates in a similar manner to pivot rollers 5b out of engagement with conveyor rollers 2a and 2c when a container is in position to depress the arm 9b. It will be understood that plural arms 9a and 9b are alternately spaced along the length of the conveyor with each arm 9a controlling a group of rollers like 5a and each arm 9b controlling a group of rollers like 5b.

The operation of the present invention is best understood by reference to FIG. 3. Here, the travelling surface of the roller conveyor assembly is shown carrying a load container N-1. When load container N-1 is compelled to stop in a particular zone of conveyor rollers, the weight of the load container N-1 presses down the detection arm 9a as illustrated in FIG. 5 by two dotted lines. As a result, shaft pin 7a is swung about its pivot point and the six transmission rollers of group 5a are displaced up and back so as to disengage the rollers of group 5a from the corresponding six conveyor rollers of group 2a and group 2b.

An upstream load container N-2 continues to be driven along the travelling surface by the groups of conveyor rollers 2c, 2a, since the transmission rollers of group 5b are still coupled to both the conveyor rollers 2a and 2c and the endless drive belt 3. As a result, container N-2 is advanced sufficiently to bring it into contact with an upstream detection arm 9b which is depressed by the weight of the container N-2. As the detection arm 9b rotates around its pivot point, the transmission rollers of group 5b operatively disengage the corresponding conveyor rollers of group 2a from the endless drive belt 3. This stops the forward movement of container N-2. Additional upstream containers are sequentially stopped in a similar manner so as to prevent a collision between containers.

When container N-1, as shown in FIG. 3, is again started on its way, the detection arm 9a returns to a non-detection position so that the upper portion extends above the travelling surface. Concurrently, the transmission rollers of group 5a frictionally engage the corresponding conveyor rollers 2a, 2b, so that advancement forces are transmitted to the upstream container N-2. Therefore, containers which are stopped along the travelling surface are advanced in sequential order.

While the invention has been particularly shown and described with reference to a preferred embodiment thereof, it will be understood by those skilled in the art that various changes in form and detail may be made therein without departing from the spirit and scope of the invention as defined by the appended claims.

I claim:

1. A roller conveyor assembly comprising:
   frame means;
   conveyor rollers rotatably mounted in said frame means so as to form a travelling surface for load containers;
   drive means for rotating said conveyor rollers,
   said drive means comprising an endless drive belt driven by a suitable power source;
   container sensing means;
   said travelling surface being divided into a plurality of successive, independent zones each containing one load sensing means and a group of conveyor rollers; and,
   control means in each zone responsive to the presence of a container in said zone;
   said control means comprising a plurality of transmission rollers adapted to detachably couple said endless drive belt and said conveyor rollers and being operative to disengage said drive means in an upstream zone of two adjacent zones when the presence of load containers is sensed in two adjacent zones,
   said transmission rollers being arranged in groups by connection to frame bars and each of said conveyor rollers having two independently operable transmission rollers adapted to detachably connect said drive belt with said conveyor rollers.

2. A conveyor roller assembly as claimed in claim 1 wherein each transmission roller associated with each of said conveyor rollers belongs to a different group of transmission rollers.

3. A roller conveyor assembly as claimed in claim 2 wherein said groups of said transmission rollers are arranged so that when said load container is sensed in a first zone, one set of transmission rollers is disengaged from said conveyor rollers located in an adjacent, upstream zone;
   said transmission rollers being further arranged so that upon the sensing of an upstream load container located in said adjacent, upstream zone, said remaining transmission rollers are disengaged from said conveyor rollers located in said adjacent, upstream zone so as to arrest the movement of said upstream container.

4. A roller conveyor assembly comprising:
   a frame means;
   conveyor rollers rotatably mounted in said frame means so as to form a travelling surface for load containers;
   drive means for rotating said conveyor rollers;
   container sensing means;
   said travelling surface being divided into a plurality of successive, independent zones each containing one load sensing means and a group of conveyor rollers;
   control means in each zone responsive to the presence of a container in said zone;
   said control means comprising a plurality of rotatably mounted transmission rollers which are arranged in groups by connection to frame bars;

said transmission rollers adapted to couple said conveyor rollers to said drive means;
each of said conveyor rollers provided with two independently operable transmission rollers;
each of said transmission rollers associated with each of said conveyor rollers belonging to a different group of transmission rollers; and,
said control means operative to disengage said drive means in an upstream zone of two adjacent zones when the presence of load containers are sensed in two adjacent zones.

5. A roller conveyor assembly as claimed in claim 4 wherein said drive means includes a source of drive power and an endless drive belt driven by said source of drive power.

* * * * *